3,299,021
ADDITION COPOLYMERS OF N-SUBSTITUTED 2-PHENYL-ALLYL CARBAMATE AND ETHYLENICALLY UNSATURATED HYDROCARBONS
Jerrold R. Denchfield, Chicago Heights, Ill., assignor to Sinclair Research, Inc., Wilmington, Del., a corporation of Delaware
No Drawing. Filed Mar. 26, 1962, Ser. No. 182,625
The portion of the term of the patent subsequent to May 19, 1981, has been disclaimed
4 Claims. (Cl. 260—88.1)

This invention relates to novel copolymers of ethylenically unsaturated hydrocarbons ($>C=C<$) containing for instance up to about 12 or 18 carbon atoms or more with the unsaturated carbamate esters prepared by the reaction of 2-phenyl allyl alcohols with isocyanates having the general formula R—N=C=O where R is a monovalent hydrocarbon radical, for instance of up to 12 or more carbon atoms. These esters can be made in accordance with copending application of J. R. Denchfield and R. P. Zmitrovis Serial No. 182,626, filed concurrently herewith.

The copolymers obtainable by this invention can be used as thermal stabilizers in polymerization reactions. They may also be used directly as plastics for numerous applications, for example, for electrical insulation purposes or as water-proofing agents or with fillers, dyes, pigments, opacifiers, etc., in a wide variety of casting, molding and laminating applications, or as impregnants and decorative surface-coating materials such as metal, wood, synthetic resins or as a finish coating over painted surfaces.

Representative ethylenically unsaturated hydrocarbons which are useful in this invention are mono-olefins such as ethylene or a substitution product thereof, a diene or di-olefin, triolefin etc. Specifically, unsaturated compounds that are suitable are ethylene, propylene, 1- and 2-butene, 1- and 2-pentene, 1- and 2-hexene, 1- and 2-octene, 1-dodecene, isobutylene, 2-methyl-1-butene, 3-methyl-1-butene, 4-methyl-1-pentene, 4-vinyl-cyclohexene, 2-methyl-2-butene, cyclohexene, 1,4-pentadiene, 1,5-hexadiene, 2-methyl-1,5-hexadiene, 3,3-dimethyl-1,5-hexadiene, 1,7-octadiene, 1,9-decadiene, butadiene, isoprene and vinyl aromatic compounds such as styrene, alpha-methylstyrene, p-methylstyrene, p-methoxystyrene and vinyl naphthalene. Alpha-olefins are preferred.

The unsaturated carbamate esters, suitable for polymerization with an ethylenically unsaturated compound can be prepared by reacting 2-phenyl allyl alcohol and an organic isocyanate represented by the general formula R—N=C=O to produce a product having the general formula

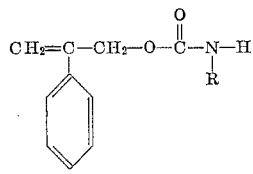

where R is a hydrocarbon radical having from one to about 12 or more carbon atoms. This product may contain additional olefinic unsaturation and may contain any non-interfering substitutent such as allyl groups. Representative compounds useful in this invention are 2-phenyl allyl (methyl, ethyl, butyl, propyl, n-butyl, isobutyl, amyl, hexyl, heptyl, octyl, ethylene, trimethylene, propylene, butylene) carbamate; 2-phenyl allyl (cyclopropane, 1,1-dimethyl cyclopentane, cyclopentylene-1,3, cyclohexylene-1,4 and cyclohexylene-1,2) carbamate; 2-phenyl allyl (phenyl, m-tolyl, beta-naphthyl, 3-biphenyl, alkoxyphenol, p-chlorophenyl, m-chlorophenyl, and p-cyanophenyl) carbamate; 2-phenyl allyl (benzyl, phenyl ethyl) carbamate. Other carbamate esters such as those produced from 2-phenyl allyl alcohol which may, if desired, be substituted as with a lower alkyl group in the phenyl radical and aliphatic, cycloalkylene and aromatic di-, tri-, and tetraisocyanates may also be used.

The proportions of copolymerizable materials may be varied over a wide range, as desired or as conditions may require, e.g. from by weight 1 to 99% of the unsaturated carbamate ester to from about 99 to 1% of the ethylenically unsaturated compound. Particularly useful copolymer compositions are obtained when the reaction mixture of copolymerizable materials contains a mole ratio of about 1:1–10 of either copolymerizable material.

The unsaturated carbamate esters can be reacted with any of the well-known ethylenically unsaturated hydrocarbons ($>C=C<$) at temperatures of from about ambient temperature to about 100 to 200° C. or more although higher or lower temperatures can be employed in accordance with usual practice. The reaction time will depend, of course, upon the reactants employed, their physical nature, i.e. solid or liquid, the nature of polymerization catalyst, the temperature of polymerization chosen and similar variable factors. Thus, for example, the polymerization may be effected in a period of from a few minutes or hours to several days, depending upon the other reaction conditions chosen.

The polymerization can be effected by means of solution polymerization in either aqueous or solvent media. The polymerization is facilitated by the use of a catalyst and elevated temperatures. The nature of the catalyst is not critical, and any of the well-known catalytic materials can be employed. Usually the so-called per-catalysts such as peroxides and persulfates are employed to catalyze the polymerization. Such materials are well known in the art, and it is not intended that the scope of the invention shall be limited to the use of any particular catalytic materials. Typical per-catalysts which are useful include such materials as benzoyl peroxide, hydrogen peroxide, potassium persulfate and the like. Friedel-Crafts type catalysts such as aluminum chloride, aluminum bromide, titanium tetrachloride, boron trifluoride, uranium chloride or the like may also be employed as well as Zeigler type catalysts. These catalysts are alkyl aluminum compounds or complexes of alkyl aluminum compounds. More generally, the useful catalysts are compounds having reducing properties such as the above or mixtures of such compounds and a reducible compound of a heavy metal. The catalysts include the hydrides, alkyl or aryl derivatives of the metals aluminum, gallium indium, beryllium, or zinc; their complexes with organic compounds, e.g. with ethers, thioethers, amines, thiophenols, carboxylic acids and sulfonic acids; or in complex linkage with alkali or alkaline earth metal hydrides, alkyls or aryls, e.g. sodium aluminum tetraphenyl. Also, the alloys or hydrides of alkali metals of alkaline earth metals are useful. Also complex compounds of the hydrides of these metals with aluminum hydride, boron hydride, alkyl or aryl borides, alkyl or aryl esters of boric acid are effective. Examples are aluminum trimethyl, aluminum triphenyl, gallium trimethyl, indium trimethyl and beryllium diphenyl. Also, halogen derivatives of the aluminum alkyls or aryls are useful, particularly the monohalides.

The reducible heavy metal compound which can be used with the above metal compounds and complexes is that of a metal of Groups IV, VI and VIII of the Periodic Table, for example, titanium, zirconium, hafnium, thorium etc. Also, iron, cobalt, nickel and manganese are useful. The preferred salts of the metals are the halides, oxyhalides, complex halides (e.g. fluorides), freshly precipitated oxides or hydroxides, alkoxides, acetates, benzoates, or acetonyl acetonate. The preferred salts of titanium or zirconium are the tetrachloride, oxychloride or the acetonylacetonate. The reaction may also be catalyzed by heat, light or radiation.

The following example is provided as illustrative of the invention.

*Example I*

A mixture of 10 g. of styrene and 10 grams of 2-phenyl-allyl-butylcarbamate together with about 0.2 gram of benzoyl peroxide were charged to a 500 ml. flask fitted with a reflux condenser. The air in the flask was replaced by nitrogen and the flask and contents were placed in a 60° C. bath. The mixture was stirred for about five hours. The reaction mass was filtered and purified and was analyzed by spectroscopic methods to confirm the allylic structure. The solid polymer was pliable and for instance was softer than polystyrene made under the same conditions.

Other solid copolymers such as the copolymers of ethylene with 2-phenyl allyl butyl carbamate; alpha-methylstyrene with 2-phenyl allyl butylene carbamate; propylene with 2-phenyl allyl phenyl carbamate; vinyl naphthalene with 2-phenyl allyl amyl carbamate; butadiene with 2-phenyl allyl cyclopropane carbamate and cyclohexene with 2-phenyl allyl benzyl carbamate may be similarly prepared.

It is claimed:

1. A composition comprising a solid copolymer of

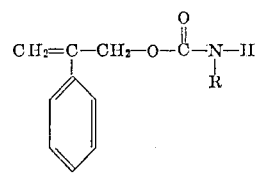

wherein R is a hydrocarbon radical of about 1 to 12 carbon atoms with a copolymerizable ethylenically unsaturated hydrocarbon which contains a $>\!C\!=\!C\!<$ grouping.

2. The composition of claim 1 wherein R is an n-butyl group.

3. The composition of claim 1 wherein the ethylenically unsaturated hydrocarbon is styrene.

4. The composition of claim 1 wherein the ethylenically unsaturated hydrocarbon has 2 to 18 carbon atoms.

References Cited by the Examiner

UNITED STATES PATENTS

| | | | |
|---|---|---|---|
| 2,483,194 | 9/1949 | Gleim | 260—77.5 |
| 2,697,720 | 12/1954 | Kaiser | 260—482 |
| 2,856,386 | 10/1958 | Smith | 260—77.5 |
| 3,133,902 | 5/1964 | Denchfield | 260—77.5 |
| 3,186,974 | 6/1965 | Verberg | 260—87.3 |

LEON J. BERCOVITZ, *Primary Examiner.*

LOUISE P. QUAST, *Examiner.*

M. C. JACOBS, *Assistant Examiner.*